(12) United States Patent
Moquin et al.

(10) Patent No.: US 7,010,098 B2
(45) Date of Patent: Mar. 7, 2006

(54) ULTRASONIC PROXIMITY DETECTOR FOR A TELEPHONE DEVICE

(75) Inventors: Philippe Moquin, Kanata (CA); Stephane Dedieu, Ottawa (CA)

(73) Assignee: Mitel Corporation, Kanata (CA)

( * ) Notice: Subject to any disclaimer, the term of this patent is extended or adjusted under 35 U.S.C. 154(b) by 670 days.

(21) Appl. No.: 09/948,217

(22) Filed: Sep. 6, 2001

(65) Prior Publication Data

US 2002/0028699 A1    Mar. 7, 2002

(30) Foreign Application Priority Data

Sep. 7, 2000    (GB)    .................................... 0021999

(51) Int. Cl.
*H04B 10/00*    (2006.01)
*H04B 1/38*    (2006.01)

(52) U.S. Cl. .................................. 379/56.1; 455/569.1
(58) Field of Classification Search ........... 379/201.06, 379/201.1, 420.01, 420.02, 433.02; 455/569, 455/575; 367/95
See application file for complete search history.

(56) References Cited

U.S. PATENT DOCUMENTS

| | | | |
|---|---|---|---|
| 3,109,893 A | | 11/1963 | Burns |
| 4,206,318 A | * | 6/1980 | Steely .................... 379/185 |
| 4,330,690 A | | 5/1982 | Botros |
| 5,539,705 A | | 7/1996 | Akerman et al. |
| 5,729,604 A | | 3/1998 | Van Schyndel |
| 5,813,998 A | * | 9/1998 | Dias .............................. 601/2 |
| 5,835,587 A | * | 11/1998 | Adachi et al. .............. 379/435 |
| 5,884,156 A | * | 3/1999 | Gordon ..................... 455/321 |
| 5,963,640 A | * | 10/1999 | Rabe ..................... 379/433.02 |
| 6,021,205 A | | 2/2000 | Yamada et al. |
| 6,104,819 A | * | 8/2000 | Nickum ..................... 381/123 |
| 6,542,436 B1 | * | 4/2003 | Myllyla ....................... 367/95 |
| 6,546,096 B1 | * | 4/2003 | Meiden et al. .......... 379/209.01 |
| 2001/0012792 A1 | * | 8/2001 | Murray ..................... 455/567 |

FOREIGN PATENT DOCUMENTS

| | | |
|---|---|---|
| DE | 43 44 753 A1 | 6/1995 |
| EP | 1 174 732 A2 | 1/2002 |
| WO | WO 92/09166 | 5/1992 |

OTHER PUBLICATIONS

Canadian Office Action dated Dec. 8, 2004 from corresponding Canadian Application No. 2,356,603.
Canadian Office Action dated Mar. 1, 2004 from corresponding Canadian Application No. 2,356,603.

* cited by examiner

*Primary Examiner*—Fan Tsang
*Assistant Examiner*—Matthew Genack
(74) *Attorney, Agent, or Firm*—Beyer Weaver & Thomas, LLP

(57)    ABSTRACT

An ultrasonic proximity detector for a telephone device to detect the proximity of an object thereto includes an ultrasound signal generator generating ultrasound that is broadcast by a speaker of the telephone device. Processing circuitry is coupled to a microphone of the telephone device. The processing circuitry processes broadcast ultrasound that is picked up by the microphone to detect the proximity of an object to the telephone device.

10 Claims, 4 Drawing Sheets

ULTRASONIC PROXIMITY DETECTOR FOR A TELEPHONE DEVICE

FIELD OF THE INVENTION

The present invention relates generally to proximity detection and in particular to an ultrasonic proximity detector for a telephone device and to a telephone device incorporating the same.

BACKGROUND OF THE INVENTION

Proximity detectors have been used in a variety of telephony applications. In one application, proximity detectors have been employed in telephones to determine the distance between the telephone handset and a user's ear. Determining whether the user's ear is close to the telephone handset allows set transitions to be made from a handset mode to a hands-free mode and vice versa. Also, this allows the acoustic output from the telephone handset loudspeaker in dual- mode mobile telephones to be limited. For example, U.S. Pat. No. 5,729,604 to Van Schyndel discloses an infrared proximity switch for use in a telephone to detect the proximity of a user's ear to the telephone handset. The proximity switch is used to switch the telephone from a hands-free mode to a handset mode when the telephone handset is brought near the user's ear.

In another application, proximity detectors have been employed in telephones to determine the proximity of the telephone handset to the telephone set. Determining whether the telephone handset is close to the telephone set also allows set transitions to be made from a handset mode to a hands-free mode and vice versa. Also, the proximity detector can be used as a hookswitch generator. For example, U.S. Pat. No. 3,109,893 to Burns discloses a proximity switch that permits a user to control a telephone without coming into physical contact with the telephone. The proximity switch is of the capacitive type and changes capacitance in response to the proximity of an object such as a user's hand.

In yet another application, proximity detectors have been employed in telephones to determine the proximity of a user's hand to the telephone. Determining whether a user's hand is close to the telephone allows the rate of adaptation or mode of operation of adaptive speaker telephones to be varied or altered thereby to alter acoustic coupling between the loudspeaker and the microphone. For example, U.S. Pat. No. 4,330,690 to Botros discloses a proximity switch for use in a telephone handset to detect the proximity of the telephone handset and the telephone set. The proximity switch includes an emitter coil in the telephone set and a pickup coil in the telephone handset. The proximity switch is operated by the inductive coupling of the emitter and pickup coils.

Although proximity switches have been used in telephones, there is a need to improve proximity switches to make them less obtrusive, more reliable, less costly and smaller. This latter requirement is especially important when proximity switches are to be used in mobile telephones.

It is therefore an object of the present invention to provide a novel ultrasonic proximity detector for use in a telephone device and a telephone device incorporating the same.

SUMMARY OF THE INVENTION

According to one aspect of the present invention there is provided an ultrasonic proximity detector for a telephone device to detect the proximity of an object thereto, said ultrasonic proximity detector comprising:

an ultrasound generator generating ultrasound that is broadcast by a speaker of said telephone device; and processing circuitry coupled to a microphone of said telephone device, said processing circuitry processing broadcast ultrasound that is picked up by said microphone to detect the proximity of an object to said telephone device.

In one embodiment, the telephone device includes a handset having a microphone, the handset being coupled to a telephone set. The processing circuitry processes the picked up ultrasound to detect the proximity of the handset to the telephone set. Preferably, the telephone set includes a cradle to accommodate the handset and the processing circuitry generates hookswitch signals when the handset is proximate to the cradle. In this case, the ultrasonic proximity detector may further include an ultrasound waveguide extending from adjacent the speaker to a portion of the cradle accommodating the handset microphone. It is also preferred that the processing circuitry includes a filter to isolate the picked up ultrasound from other signals picked up by the microphone and a threshold detector coupled to the filter to determine ultrasound levels above a threshold level.

In another embodiment, the telephone device is a mobile telephone and the processing circuitry processes the picked up ultrasound to detect the proximity of a portion of a user to the mobile telephone. In this embodiment, the processing circuitry also includes a filter to isolate the picked up ultrasound from other signals picked up by the microphone and a threshold detector coupled to the filter to determine ultrasound levels above a threshold level. In this case, the threshold detector outputs transition signals when a user's hand is proximate to the mobile telephone to switch the mode of operation of the mobile telephone. Alternatively, the processing circuitry includes a filter to isolate the picked up ultrasound from other signals picked up by the microphone and scaling circuitry coupled to the filter. The scaling circuitry scales the level of voice signals applied to the loudspeaker for broadcast with the ultrasound.

In yet another embodiment, the telephone device is a full-duplex speaker telephone having a hands-free microphone. The processing circuitry processes the picked up ultrasound to detect the proximity of an object that alters the coupling between the hands-free microphone and the speaker. In this case, the processing circuitry includes a filter to isolate the picked up ultrasound from other signals picked up by the microphone, a threshold detector to detect when the ultrasound level is above a threshold level, and a digital signal processor executing a full-duplex algorithm. The digital signal processor is responsive to the threshold detector and acts on signals picked up by the microphone.

In still yet another embodiment, the telephone device is a telephone headset and the processing circuitry processes the picked up ultrasound to detect if the headset is being worn by a user.

According to another aspect of the present invention there is provided a telephone device comprising:

a telephone set;

a handset coupled to said telephone set;

a cradle on said telephone set to accommodate said handset;

a keypad on said telephone set;

a loudspeaker and microphone assembly accommodated by said telephone set;

circuitry within said telephone set to handle incoming and outgoing telephone calls; and an ultrasonic proximity detector accommodated by said telephone set, said ultrasonic proximity detector including:

an ultrasound generator generating ultrasound that is broadcast by said loudspeaker and microphone assembly; and processing circuitry coupled to said loudspeaker and microphone assembly, said processing circuitry processing broadcast ultrasound that is picked up by said loudspeaker and microphone assembly to detect the proximity of said handset to said telephone set.

According to yet another aspect of the present invention there is provided a mobile telephone comprising:

a telephone set;
a keypad on said telephone set;
a loudspeaker accommodated by said telephone set;
a microphone accommodated by said telephone set;
circuitry within said telephone set to handle incoming and outgoing telephone calls; and
an ultrasonic proximity detector accommodated by said telephone set, said ultrasonic proximity detector including:
an ultrasound generator generating ultrasound that is broadcast by said loudspeaker; and
processing circuitry coupled to said microphone, said processing circuitry processing broadcast ultrasound that is picked up by said microphone to detect the proximity of a portion of a user to said mobile telephone.

According to still yet another aspect of the present invention there is provided a full-duplex telephone device comprising:

a telephone set;
a keypad on said telephone set;
a loudspeaker accommodated by said telephone set;
a hands-free microphone accommodated by said telephone set;
circuitry within said telephone set to handle incoming and outgoing telephone calls; and
an ultrasonic proximity detector accommodated by said telephone set, said ultrasonic proximity detector including:
an ultrasound generator generating ultrasound that is broadcast by said loudspeaker; and
processing circuitry coupled to said hands-free microphone, said processing circuitry processing broadcast ultrasound that is picked up by said hands-free microphone to detect the proximity of an object that alters the coupling between said hands-free microphone and said loudspeaker.

The present invention provides advantages in that the ultrasonic proximity detector is easily and inexpensively incorporated into the telephone device. This is achieved by using production receivers, speakers and microphones in the telephone device and simple analogue circuitry to process the ultrasound component of signals picked up by the telephone device microphone.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
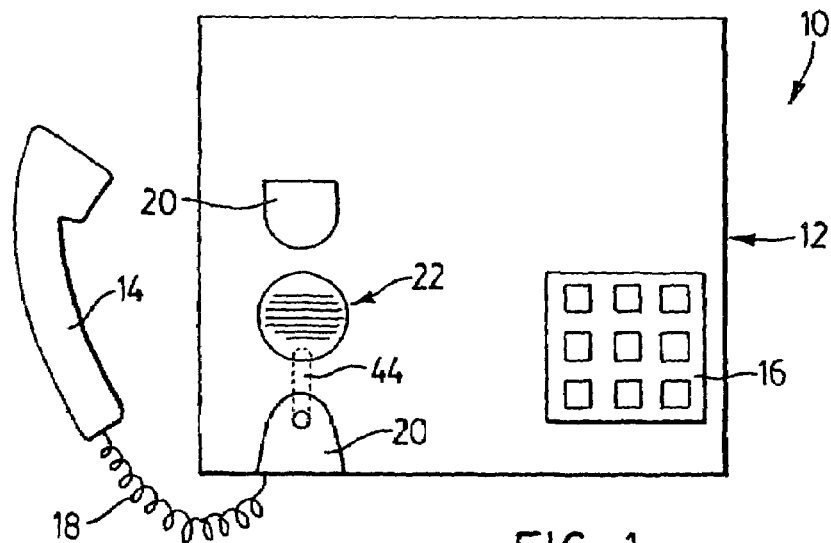
FIG. 1 shows a desktop group listening telephone capable of operating in either a handset mode or a hands-free mode and incorporating an ultrasonic proximity detector in accordance with the present invention.

Turning now to FIG. 1, a desktop group listening telephone such as that manufactured by Mitel Corporation of Kanata, Ontario under Series No. SS4xxx is shown and is generally indicated to by reference numeral 10. As can be seen, telephone 10 includes a telephone set 12, a handset 14 coupled to the telephone set 12 by a cord 18, a cradle 20 on the telephone set 16 to accommodate the handset 14 and a keypad 16. A loudspeaker and microphone assembly 22 is accommodated by the telephone set 16 adjacent the cradle 20.

In the present embodiment, the telephone 10 includes the necessary conventional circuitry (not shown) to enable a user to make and answer telephone calls. The telephone 10 is operable in a handset mode when the handset 14 is removed from the cradle 20 during a telephone call and a hands-free mode when the handset 14 is left in the cradle during a telephone call.

Figure 2:
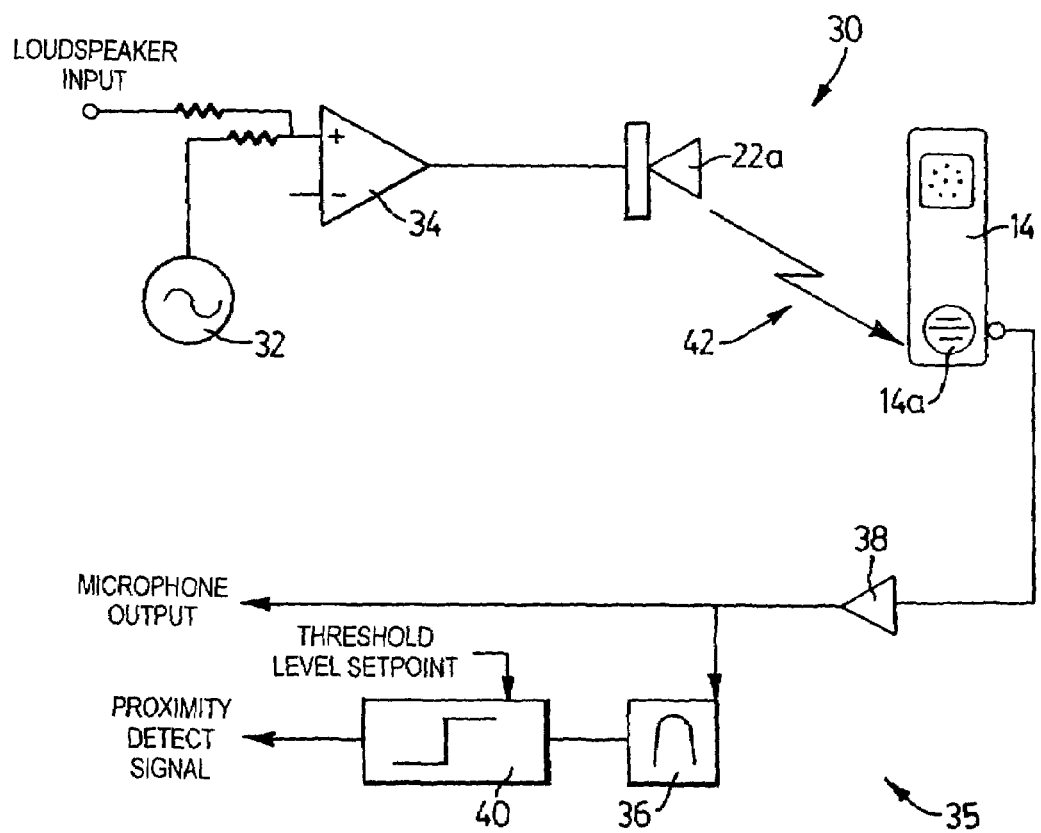
FIG. 2 is a schematic circuit diagram of the ultrasonic proximity detector incorporated in the telephone of FIG. 1.

In addition to the conventional circuitry referred to above, the telephone set 12 accommodates an ultrasonic proximity detector generally indicated to by reference numeral 30 (see FIG. 2). In this embodiment, the ultrasonic proximity detector 30 generates hookswitch signals when the handset 14 is proximate to the cradle 20. As can be seen, the ultrasonic proximity detector 30 includes an ultrasound signal generator 32 coupled to the loudspeaker 22a of the loudspeaker and microphone assembly 22 via a loudspeaker amplifier 34. The ultrasonic proximity detector 30 also includes ultrasound processing circuitry generally identified by reference numeral 35. Processing circuitry 35 includes a bandpass filter 36 coupled to the microphone 14a in the handset 14 via a preamplifier 38. A threshold detector 40 is coupled to the bandpass filter 36. The threshold detector 40 outputs hookswitch signals when the handset 14 is proximate the cradle 20 as will now be described.

In operation, the ultrasound signal generator 32 outputs ultrasound having a frequency in the range of from about 20 kHz to 80 kHz on a regular or continuous basis. The signal may be a tone, a tone burst or a coded signal. The ultrasound is conveyed to the amplifier 34, which may also receive voice signals to be broadcast by the loudspeaker 22a. The amplifier 34 sums the voice signals and the ultrasound and conveys the summed signals to the loudspeaker 22a. The loudspeaker 22a in turn broadcasts the summed signals.

When the handset 14 is proximate to the loudspeaker and microphone assembly 22, the summed signals broadcast by the loudspeaker 22a are picked up by the microphone 14a in the handset 14. This coupling between the loudspeaker 22a and the microphone 14a in the handset 14 is designated by reference numeral 42. The summed signals picked up by the microphone 14a are amplified by the preamplifier 38 and are then conveyed to the bandpass filter 36. Bandpass filter 36 isolates the ultrasound component from the summed signals and conveys the ultrasound component to the threshold detector 40. The threshold detector 40 compares the level of the ultrasound component received from the bandpass filter 36 with a threshold level set point. If the level of the ultrasound component received from the bandpass filter 36 is greater than the threshold level set point, the threshold detector 40 outputs a hookswitch signal signifying that the handset 14 is very close to the cradle 20. As a result, the handset 14 does not need to be perfectly seated in the cradle 20 for a hookswitch signal to be generated.

To improve sensitivity, an ultrasound waveguide 44 can be incorporated into the telephone set 12 that extends between the portion of the cradle 20 accommodating the microphone 14a of the handset 14 and the loudspeaker and microphone assembly 22. The waveguide 44 ensures strong ultrasound signal coupling between the loudspeaker 22a and the microphone 14a of the handset 14 when the handset is proximate to the cradle 20.

Although the preamplifier 38 is shown as amplifying the output of the microphone 14a prior to it being filtered by bandpass filter 36, the microphone output can be filtered first and then amplified by preamplifier 38 before being conveyed to the threshold detector 40.

Figure 3:
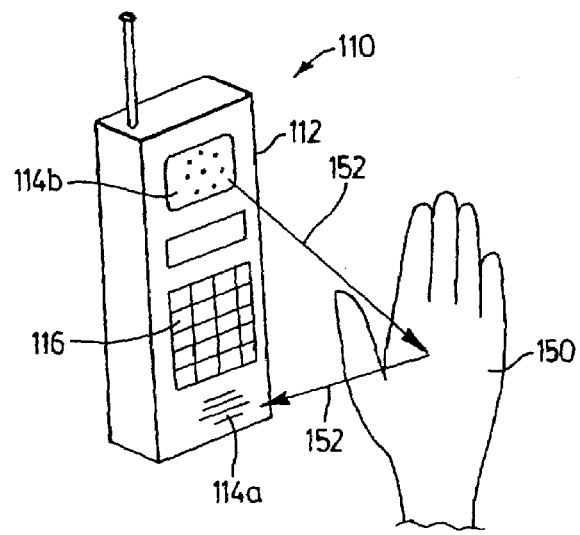
FIG. 3 shows a mobile telephone incorporating an alternative embodiment of an ultrasonic proximity detector in accordance with the present invention.
Figure 4A:
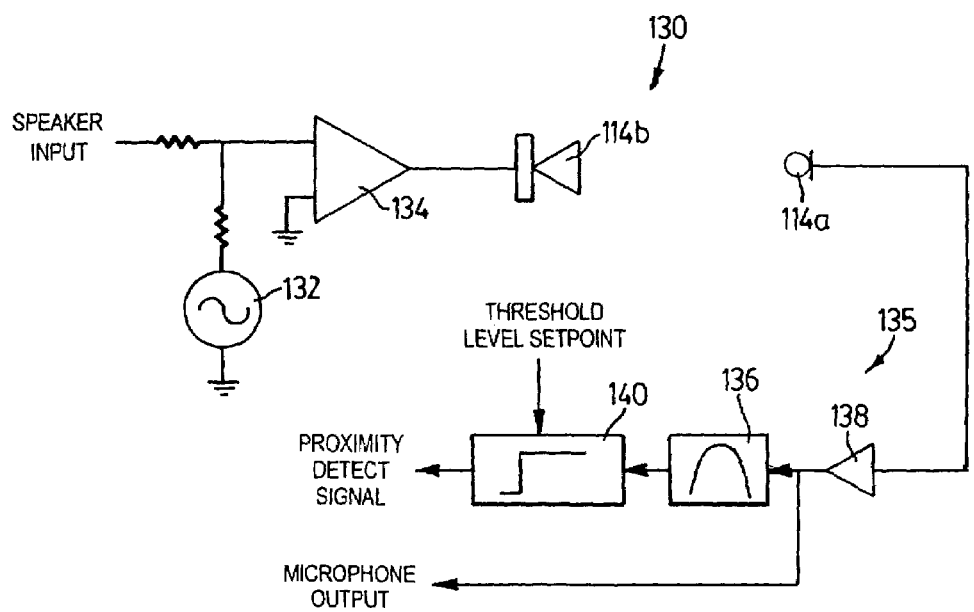
FIG. 4a is a schematic circuit diagram of the ultrasonic proximity detector incorporated in the mobile telephone of FIG. 3.

Turning now to FIGS. 3 and 4a, a mobile telephone 110 incorporating an ultrasonic proximity detector 130 is shown. Mobile telephone 110 includes a housing 112 accommodating a microphone 114a, a speaker 114b and a keypad 116 positioned between the microphone 114a and the speaker 114b. The ultrasonic proximity detector 130 is very similar to that shown in FIG. 2 and includes an ultrasound signal generator 132, an amplifier 134, and ultrasound processing circuitry 135 constituted by a preamplifier 138, a bandpass filter 136 and a threshold detector 140.

In operation, the ultrasound signal generator 132 outputs ultrasound and conveys the ultrasound to the amplifier 134. Amplifier 134 sums the ultrasound with voice input and outputs the summed signals to the speaker 114b. The speaker 114b in turn broadcasts the summed signals.

When an object such as a user's hand identified by reference numeral 150 is proximate to the mobile telephone 110, the signals broadcast by the speaker 114b are reflected from the object and are picked up by the microphone 114a as illustrated by arrows 152. Signals picked up by the microphone 114a are conveyed to preamplifier 138. The output of preamplifier 138 is conveyed to the bandpass filter 136, which isolates the ultrasound component of the signals picked up by the microphone 114a. The ultrasound component output by bandpass filter 136 is conveyed to the threshold detector 140 and its level is compared with the threshold level set point. If the level of the ultrasound component exceeds the threshold level set point, the threshold detector 140 outputs a proximity detect signal signifying that the user's hand is very close to the mobile telephone 110. In this manner, the proximity of the user's hand 150 can be used to toggle the mobile telephone 110 between speaker and handset modes in the manner described in U.S. Pat. No. 5,729,604 to Van Schyndel.

Figure 4B:
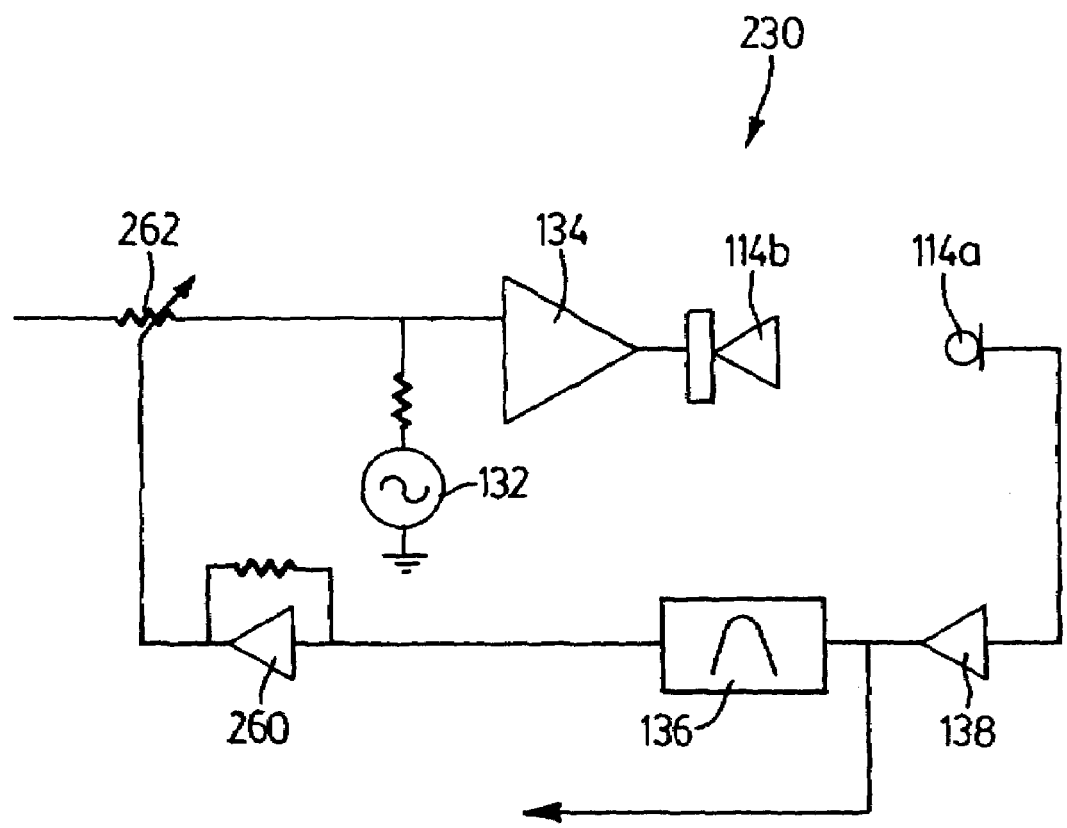
FIG. 4b is a schematic circuit diagram of an alternative embodiment of an ultrasonic proximity detector for incorporation in the mobile telephone of FIG. 3.

Turning to FIG. 4b, an alternative embodiment of the ultrasonic proximity detector for the mobile telephone 110 is illustrated and is generally identified by reference numeral 230. In this embodiment, the threshold detector is replaced with an operational amplifier 260 and a variable resistor 262. Operational amplifier 260 receives the output of the bandpass filter 136 and provides output to control the resistance of the variable resistor 262. The variable resistor is used to scale voice input conveyed to the amplifier 134 for broadcast by the speaker 114b. In this manner, a smooth transition from the speaker mode to the handset mode can be achieved. If desired, the ultrasonic proximity detector 230 can also include the threshold detector 140 if the mobile telephone 110 includes circuitry that executes an algorithm requiring ultrasound level threshold information such as variable equalization or adaptive echo-canceling.

Figure 5:
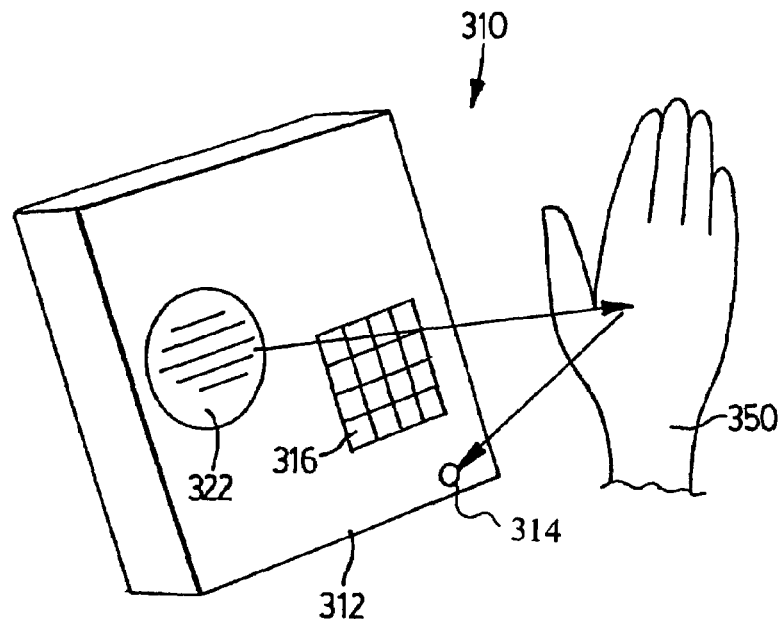
FIG. 5 shows a speaker telephone incorporating yet another alternative embodiment of an ultrasonic proximity detector in accordance with the present invention.
Figure 6:
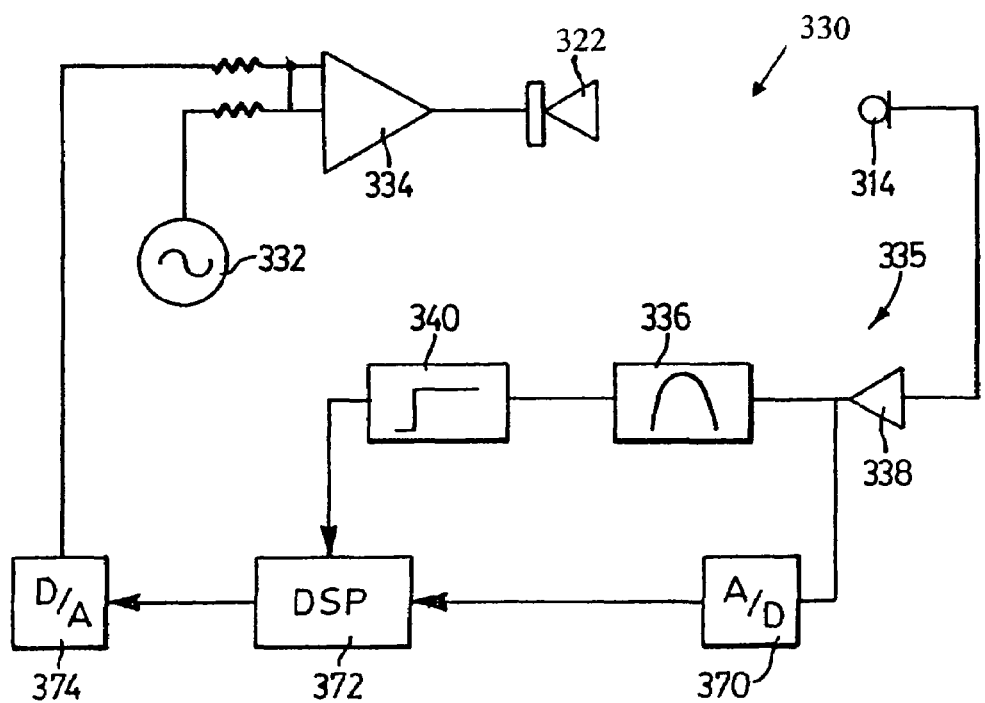
FIG. 6 is a schematic circuit diagram of the ultrasonic proximity detector incorporated in the speaker telephone of FIG. 5.

Turning now to FIGS. 5 and 6, a full-duplex speaker telephone incorporating an ultrasonic proximity detector 330 is shown and is generally identified to by reference numeral 310. As can be seen, speaker telephone 310 includes a telephone set 312 accommodating a keypad 316 and a loudspeaker 322. In full-duplex speaker telephones, adaptive filters are used to provide acoustic echo cancellation of the echo that arises from the coupling between the loudspeaker 322 and the hands-free microphone 314 in the room. The room is modeled as a Finite Impulse Response (FIR) filter having taps that vary reasonably slowly with relatively small amplitude fluctuations. Unfortunately, when a user's hand 350 approaches the speaker telephone 310, a strong echo is introduced. Presently, the adaptation speed of the adaptive filters is chosen as a compromise between room level variations and proximity of objects that can change the loudspeaker and microphone coupling very fast and very significantly.

The ultrasonic proximity detector 330 allows the adaptation coefficients of the adaptive filter to be varied to deal with objects proximate to the speaker telephone 310. In this embodiment, the ultrasonic proximity detecter 330 includes a loudspeaker 332 an amplifier 334, a hands-free microphone 314 and ultrasound processing circuitry 335 constituted by a preamplifier 338, a bandpass filter 336, a threshold detector 340, an analogue to digital converter 370, a digital signal processor (DSP) 372 and a digital to analogue converter 374. Similar to the previous embodiments, the threshold detector 340 compares the level of the ultrasound component output by the bandpass filter 336 with the threshold level set point to determine the proximity of an object to the loudspeaker 322 of the speaker telephone 310. The output of the threshold detector 340 and the digitzed output of the preamplifier 338 are conveyed to the digital signal processor 372, which executes a full-duplex algorithm. The output of the DSP 372 is conveyed to the digital to analogue converter 374 before being conveyed to the amplifier 334. In this manner, the output of the threshold detector 340 can be used to vary the adaptation coefficients of the adaptive filter to deal with objects priximate to the speaker telephone 310 that cause rapid variation of echoes.

As will be appreciated, the present invention provides simple ultrasonic proximity detectors for incorporation in telephone devices such as telephones and telephone headsets.

If desired, the output of the bandpass filters can be processed and digitized to provide better resolution of the proximity of objects to the telephone device. This is particularly useful in telephone devices that incorporate a digital signal processor such as wireless telephones, full-duplex speaker telephones and packetized voice (VoIP) telephones.

The ultrasonic proximity detector may also be incorporated into a telephone device headset to detect if the headset is actually being worn by a user. This is useful in PC-based telephone applications.

Although preferred embodiments of the present invention have been described, those of skill in the art will appreciate that variations and modifications may be made without departing from the spirit and scope thereof as defined by the appended claims.

We claim:

1. A telephone device comprising:
    a telephone set;
    at least one speaker associated with said telephone set to broadcast output audio signals;
    a handset associated with said telephone set and having a microphone to receive input audio signals; and
    an ultrasound proximity detect unit comprising:
        an ultrasound generator generating ultrasound that is broadcast by said speaker;
        processing circuitry coupled to said microphone, said processing circuitry processing broadcast ultrasound that is picked up by said microphone to detect the proximity of said handset to said telephone set; and
        an ultrasound waveguide extending from adjacent said speaker to a portion of a cradle of said telephone set accommodating the handset microphone.

2. A telephone device according to claim 1 wherein, said processing circuitry generates hookswitch signals when said handset is proximate to said cradle.

3. A telephone device according to claim 1 wherein said processing circuitry comprises a filter to isolate the picked up ultrasound from other signals picked up by said microphone and a threshold detector coupled to said filter to determine ultrasound levels above a threshold level.

4. A telephone device according to claim 3 wherein said threshold detector outputs hookswitch signals when said handset is within a threshold distance from said telephone set.

5. A telephone device according to claim 4 wherein said processing circuitry further comprises a preamplifier.

6. A telephone device comprising:
    a telephone set;
    a handset coupled to said telephone set;
    a cradle on said telephone set to accommodate said handset;
    a keypad on said telephone set;
    a loudspeaker and microphone assembly accommodated by said telephone set;
    circuitry within said telephone set to handle incoming and outgoing telephone calls; and
    an ultrasonic proximity detector accommodated by said telephone set, said ultrasonic proximity detector comprising:
        an ultrasound generator generating ultrasound that is broadcast by said loudspeaker and microphone assembly;
        processing circuitry coupled to said loudspeaker and microphone assembly, said processing circuitry processing broadcast ultrasound that is picked up by said loudspeaker and microphone assembly to detect the proximity of said handset to said telephone set; and
        an ultrasound waveguide extending from adjacent said loudspeaker and microphone assembly to a portion of the cradle accommodating the handset microphone.

7. A telephone device according to claim 6 wherein said processing circuitry generates hookswitch signals when said handset is proximate to said cradle.

8. A telephone device according to claim 7 wherein said processing circuitry comprises a filter to isolate the picked up ultrasound from other signals picked up by said loudspeaker and microphone assembly and a threshold detector coupled to said filter to determine ultrasound levels above a threshold level.

9. A telephone device according to claim 8 wherein said threshold detector outputs hookswitch signals when said handset is within a threshold distance from said telephone set.

10. A telephone device according to claim 9 wherein said processing circuitry further includes a preamplifier.

* * * * *